UNITED STATES PATENT OFFICE 2,261,084

UREA-FORMALDEHYDE-ACID-AMINE CO-CONDENSATION PRODUCTS AND PROCESS OF MAKING THE SAME

Almon G. Hovey, Birmingham, and Theodore S. Hodgins, Royal Oak, Mich., assignors to Reichhold Chemicals, Inc., formerly Beck, Koller & Company, Inc., Detroit, Mich.

No Drawing. Application December 27, 1938, Serial No. 247,988

10 Claims. (Cl. 260—42)

The invention relates to co-condensation products formed by reacting urea, a carbonyl compound such as formaldehyde, a polyfunctional carboxylic acid, and an organic amine, and to the process of producing the same.

The present application is a continuation-in-part of our copending application Serial No. 147,569, filed June 10, 1937, now Patent No. 2,153,801 dated April 11, 1939, wherein are broadly disclosed various types of polyfunctional organic acids and organic amines capable of reacting to form condensation products, and wherein is also broadly disclosed the reaction of urea, formaldehyde, organic acids and organic amines. The broad disclosure of Serial No. 147,569, now Patent No. 2,153,801, has been specifically amplified in the following applications: Ser. No. 188,392, filed February 2, 1938, now Patent No. 2,149,678, dated March 7, 1939, Ser. No. 239,879, filed November 10, 1938, now Patent No. 2,195,570, dated April 2, 1940, Ser. No. 245,018, filed December 10, 1938, Ser. No. 245,984, filed December 15, 1938, now Patent No. 2,197,723, dated April 16, 1940, Ser. No. 246,488, filed December 17, 1938, now Patent No. 2,230,326, dated Feb. 4, 1941, of which also the present application is a continuation-in-part, since it is contemplated that the various types of acid-amine resins therein disclosed shall be used in the formation of the co-condensation products to which the claims of the present application are directed.

As set forth in our various prior patents and pending applications referred to above, we have found that a new and useful group of resins may be formed by reacting various polyfunctional organic acids with organic amines, particularly the organic mono-amines such as isobutylamine, dioctylamine, aniline, pyridine and the like. The present application is concerned with the further reaction which takes place when such polyfunctional organic acids and organic amines are condensed with urea and formaldehyde or with reaction products of urea formaldehyde type such as dimethylolurea and urea formaldehyde butanol reaction products.

We have in our Patent No. 2,109,291 dated February 22, 1938 described the preparation of certain modified urea-formaldehyde condensation products suitable as coating compositions, and in our applications Serial Nos. 203,149, filed April 20, 1938, now Patent 2,221,708, dated Nov. 12, 1940, and 237,578, filed October 28, 1938, now Patent 2,226,518, dated Dec. 24, 1940, we have described certain modified dimethylolurea and urea-formaldehyde products and processes for making the same, which products are adapted for use in the preparation of the co-condensation products herein set forth.

Various methods of forming the urea-formaldehyde-acid-amine condensation products of the present invention are contemplated. Thus the condensation may be carried out in one stage, or in more than one stage, and in the presence or absence of an active or inactive solvent. The following are mentioned as representative:

1. A one-stage process using a solvent which may or may not be active, such as butanol.
2. A one-stage process without solvent.
3. Two-stage process with solvent.
4. Two-stage process without solvent.
5. Three-stage process with solvent.
6. Three-stage process without solvent.

The various co-condensation products of the present invention are adapted for various uses depending on the particular reacting ingredients and the method of preparation. The following types of uses are mentioned as illustrative:— a. Coating compositions (aqueous type).
b. Impregnant compounds (aqueous type for textiles and for moldings).
c. Coating compositions (non-aqueous) as enamel constituent or as enamel without further addition.
d. Molding compositions in the gel state.

As coating compositions, the general advantages of these acid-amine modified urea-formaldehyde condensation products are as follows:

1. Improved adhesion to metals, glass, and other surfaces as compared to the unmodified urea-formaldehyde resin.
2. These resins have, in general, better water-resistance than resins made according to U. S. Patent 2,109,291.
3. It seems to be easier to obtain good gloss from these products than from the urea-formaldehyde resins described in Serial No. 203,149 and in U. S. Patent 2,109,291.

The water-soluble products may be used as impregnating compounds for fabrics and may also be used as impregnant for laminated paper for laminated moldings.

The invention will be more readily understood by reference to the accompanying specific examples which are intended as illustrative of the inventive thought:

Example 1

To one mol of benzoyl benzoic acid, two mols of isobutyl amine were added. An exothermic reaction takes place which warms the mixture of ingredients to approximately 70° C. These ingredients are allowed to react from their own heat for a period of 10-30 minutes and then when the reaction has run its course, the reaction may be carried further by supplying heat to the reaction mixture. The heating is best done at about 150° C. using a reflux condenser to prevent the escape of isobutyl amine. When the refluxing has proceeded far enough so that there is no odor of isobutyl amine the condenser may be removed and heating discontinued. This process forms a pale straw colored resin. This material was soluble, while hot, in mineral spirits about one volume to one volume, but when it cooled the resin precipitated from solution. When this material was thinned with butanol, it formed a very stable solution which blended with practically all of the commercial types of alkyd resins even if they were already cut 50% in mineral spirits.

*Example 2*

One mol of lactic acid when in contact with one mol of isobutyl amine undergoes an exothermic reaction which raises the temperature to approximately 80° C. At this stage it is a water-white balsam. Upon further heating this product turns to a yellow color at about 112° C. and to an orange color at about 175° C. Upon further heating a brown sticky balsam results which appears to be of value as a resin plasticizer.

The mol ratios or proportions of the reacting ingredients given in the above examples are in no way to be considered as a limitation of the scope of this invention. The well known skill of resin cooking may be applied to this new family of resins in many cases with desirable results, for example: Protection from air by an inert atmosphere may be used to protect the color of the resin from darkening. Likewise vacuum treatment may be used to remove the products of reaction and raise the melting points. Bleaching agents may be used. The solutions may be filtered to clarify and stabilize them.

This family of resins made from acids and amines may be modified by other ingredients to vary the properties in much the same way that alkyd resins made from polybasic acids and polyhydric alcohols have been modified with the fatty acids, resinous acids and phenolic condensation products. Further modifications of this family of resins may be made to form new products with new and still further useful properties. It is to be understood that such modifications also come under the scope of this invention.

Conversely, other resinification products, varnish bases, etc., which are modified with this family of resins are to be considered as applications of this invention and also included by it. As an example for a use of our invention to modify other resinous products the following is a good example: the resin made from benzoyl benzoic acid and isobutyl amine as shown in Example 1 is used in combination with the urea-formaldehyde condensation prodess. 200 parts of the resin prepared as in Example 1, and 62 parts of formaldehyde (commercial solution 37-40%), and 30 parts of urea are reacted together. First the formaldehyde is added to the resin made from benzoyl benzoic acid and isobutyl amine and a cloudy white precipitation occurs during the initial stages of reaction, but this soon clears up between 50-60° C. When the fomaldehyde is added the temperature rises from room temperature to 50-70° C. Upon adding 30 parts of urea the solution became somewhat viscous, but it becomes clear upon gradually increasing the temperature to 95° C. and holding. The material becomes more and more viscous but still remains clear. When the desired viscosity is obtained the material may be thinned with butanol to a 60% solution. This clear straw colored viscous solution in butanol is miscible with all types of commercial alkyd resin solutions, such as the solutions commercially known under the Trade Mark "Beckosol", which are oil or acid modified types of polybasic acid-polyhydric alcohol resins, in solution form, using hydrocarbon solvents, either of the aromatic or aliphatic type and is desirable in the preparation of light colored enamels. The product is soluble in butanol, xylol or toluol to practically any proportion and soluble to approximately equal parts by volume in mineral spirits. This modified urea-formaldehyde condensation product bakes out to a clear and hard film either by itself or in combination with any of the above mentioned alkyd resins showing complete compatibility of the resins even in a baked film where the solvents have had a chance to evaporate.

*Example 3*

(a) One mol of benzophenone-dicarboxylic acid was reacted with one mol of isobutylamine for 30 minutes at 120-270° C. forming a pale straw colored resin, curing at 11 seconds on a 200° C. hot plate. The resin was insoluble in water, toluol and mineral spirits, but soluble in acetone and alcohol.

(b) To 100 parts by weight of the product described in (a), 81 parts by weight of 37% formaldehyde was added. The mixture clears at 90° C. Then 30 parts by weight of urea was added, forming a hard brittle, pale straw colored resin on heating for 1 hour at 90-190° C. which had a cure of 20 seconds on a 200° C. hot plate. This product is admirable as a light colored, low baking, enamel finish or as a component of such.

*Example 4*

(a) One mol of glucono-d-lactone was reacted with one mol of pyridine for 20 minutes at 110-135° C., resulting in a red resin having a cure of 18 seconds on a 200° C. hot plate. This product was soluble in water; slightly soluble in acetone and alcohol; and insoluble in toluol and mineral spirits.

(b) To 100 parts by weight of the product described in (a), 81 parts by weight of 37% formaldehyde was added. The mixture cleared after 15 minutes at 100° C. and 30 parts by weight of urea was added. After heating at 125° C. for 1 hour a clear straw colored resin resulted which is soluble in alcohols and cures at 55 seconds on the 200° C. hot plate.

*Example 5*

120 parts (1 mol) of dimethylolurea is reacted with one mol of benzoylbenzoic acid and one mol of isobutylamine for 30 minutes at 65-115° C. producing a brown resin having a cure time of 23 seconds on the hot plate at 200° C. This resin is insoluble in water; soluble in acetone, alcohol, toluol and to a very limited extent in mineral spirits. Products of this type are suggested for lacquers and for hardening clear and pigmented alkyl enamels.

*Example 6*

One mol of dimethylolurea is reacted with one mol of benzoylbenzoic acid and one mol of tri-isopropanolamine for 30 minutes at 40-115° C.

producing a pale straw colored resinous product during in 11 seconds on the hot plate at 200° C. This product has limited solubility in water, acetone and alcohol; and is insoluble in toluol and mineral spirits. Products produced along the lines of this example are suggested for use as water soluble impregnants for paper, cloth, textiles, etc.

*Example 7*

One mol of dimethylolurea is reacted with one mol of succinic acid and one mol of isobutylamine for 30 minutes at 80–165° C., producing a pale amber colored resin which cures in 18 seconds on the hot plate at 200° C. This resin is soluble in water and alcohol, but insoluble in acetone, toluol and mineral spirits.

*Example 8*

One mol of dimethylolurea is reacted with one mol of lactic acid and one mol of isobutylamine producing a pale straw yellow resin in 30 minutes at 70–170° C. This product has a cure time of 26 seconds on the hot plate at 200° C. and is completely soluble with water and alcohol; partly soluble in acetone and toluol and insoluble in mineral spirits.

*Example 9*

One mol of dimethylolurea is reacted with one mol of crotonic acid and one mol of isobutylamine for 30 minutes at 80–175° C. producing an amber colored resin which cures in 6 seconds on the hot plate at 200° C. This product is soluble in alcohol; partly soluble in water and acetone and insoluble in mineral spirits.

*Example 10*

One mol of dimethylolurea is reacted with one mol of adipic acid and one mol of dioctylamine for 30 minutes at 110–170° C. The resulting resin is pale straw color having a cure time of 27 seconds on the hot plate at 200° C. This product is soluble in water, acetone, alcohol, toluol and mineral spirits. This resin may be used for high baking enamels where extreme hardness and flexibility is desired.

*Example 11*

(a) one mol of benzoylbenzoic acid was reacted with one mol of isobutylamine for 30 minutes from 100–190° C., yielding a pale straw colored resinous product having a cure of 29 seconds on the hot plate at 200° C. This resin was insoluble in water, acetone, toluol and mineral spirits, but soluble in alcohol.

(b) 50 parts by weight of the product described in (a) was reacted with 84 grams of a urea-formaldehyde-butanol resin for one hour at 120–130° C. producing a pale straw colored resinous product having a cure of 8 seconds on the hot plate at 200° C. The resulting resin was insoluble in water and mineral spirits, but soluble in acetone, alcohol and toluol. This product because of its pale light color and fast heat-hardening characteristics may be used for producing hard colorless enamels.

*Example 12*

(a) One mol of adipic acid was reacted with one mol of dioctylamine at 136–270° C. for 30 minutes. The resulting water-white resin had a cure of 25 seconds on the 200° C. hot plate. This product was insoluble in water, and soluble in acetone, alcohol and toluol, and to a limited extent in mineral spirits.

(b) 50 parts by weight of the resin described in (a) was reacted with 84 parts of a urea-formaldehyde-butanol resin for one hour at 120–130° C. The resulting pale straw to water-white product had a cure of 27 seconds on the hot plate at 200° C. The resin was insoluble in water, but soluble in acetone, alcohol, toluol and mineral spirits.

We claim:

1. A process as set forth in claim 4, wherein the condensation is carried out in a single stage.

2. A process as set forth in claim 4, wherein the condensation is carried out in more than one stage.

3. An artificial resin suitable for use in coating compositions and the like formed by condensing urea and formaldehyde with a preformed resin derived from a polyfunctional carboxylic acid and an organic mono-amine, said urea, formaldehyde, and acid-amine resin comprising the principal reacting ingredients.

4. A process for producing an artificial resin which comprises co-condensing urea, formaldehyde, a poly-functional carboxylic acid and an organic mono-amine, said urea, formaldehyde, acid and amine constituting the principal reacting ingredients, the molecular quantity of the acid employed being equal to that of the urea, and said amine being used in the proportion of 1 to 2 mols per mol of acid.

5. A process for producing an artificial resin which comprises condensing urea and formaldehyde with a resin formed from a polyfunctional carboxylic acid and an organic mono-amine, said urea, formaldehyde, and acid amine resin comprising the principal reacting ingredients.

6. An artificial resin formed by co-condensing urea, formaldehyde, a polyfunctional carboxylic acid, and an organic mono-amine, said urea, formaldehyde, acid and amine constituting the principal reacting ingredients, the molecular quantity of the acid employed being equal to that of the urea, and said amine being used in the proportion of 1 to 2 mols per mol of acid.

7. An artificial resin suitable for use in coating compositions and the like formed by reacting dimethylol urea with a polyfunctional carboxylic acid and an organic mono-amine, said dimethylol urea and said acid and amine constituting the principal reacting ingredients, the molecular quantities of said acid and said amine being equal to the molecular quantity of the dimethylolurea.

8. An artificial resin formed by reacting a urea-formaldehyde reaction product with a resin derived from a polyfunctional carboxylic acid and an organic mono-amine, said urea-formaldehyde reaction product, said acid and said amine constituting the principal reacting ingredients.

9. An artificial resin formed by reacting dimethylolurea, a polyfunctional carboxylic acid, and an organic mono-amine in substantially equimolecular proportions, said dimethylolurea, said acid and said amine constituting the principal reacting ingredients.

10. An artificial resin formed by reacting a resin formed by reacting a polyfunctional carboxylic acid and an organic mono-amine, with urea and formaldehyde, said acid-amine reaction product, and said urea and formaldehyde constituting the principal reacting ingredients.

ALMON G. HOVEY.
THEODORE S. HODGINS.